J. BUCKLEY.
CONTROL MECHANISM FOR ELECTRIC MOTORS.
APPLICATION FILED MAY 28, 1913.
1,136,405.
Patented Apr. 20, 1915.
3 SHEETS—SHEET 1.
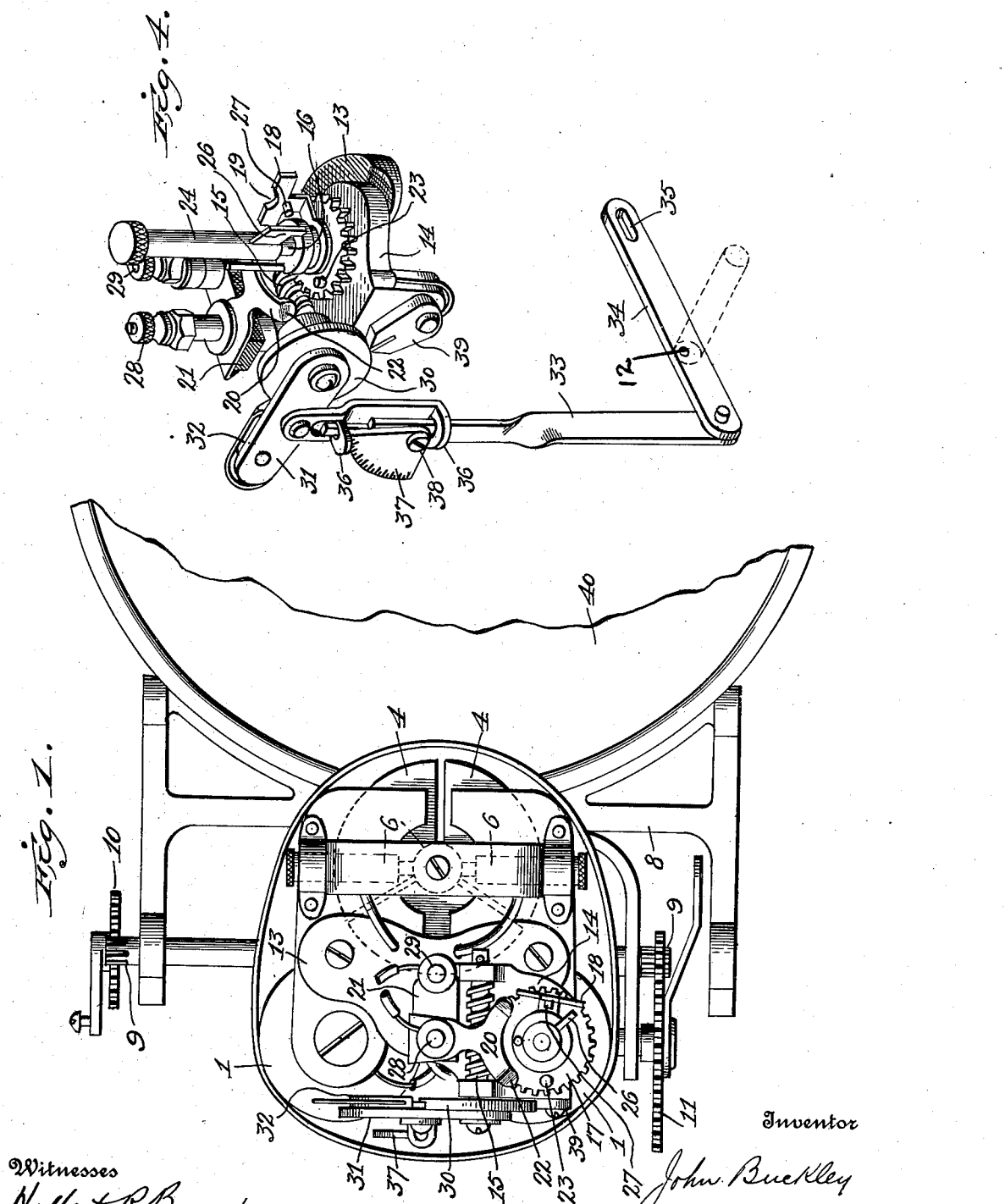

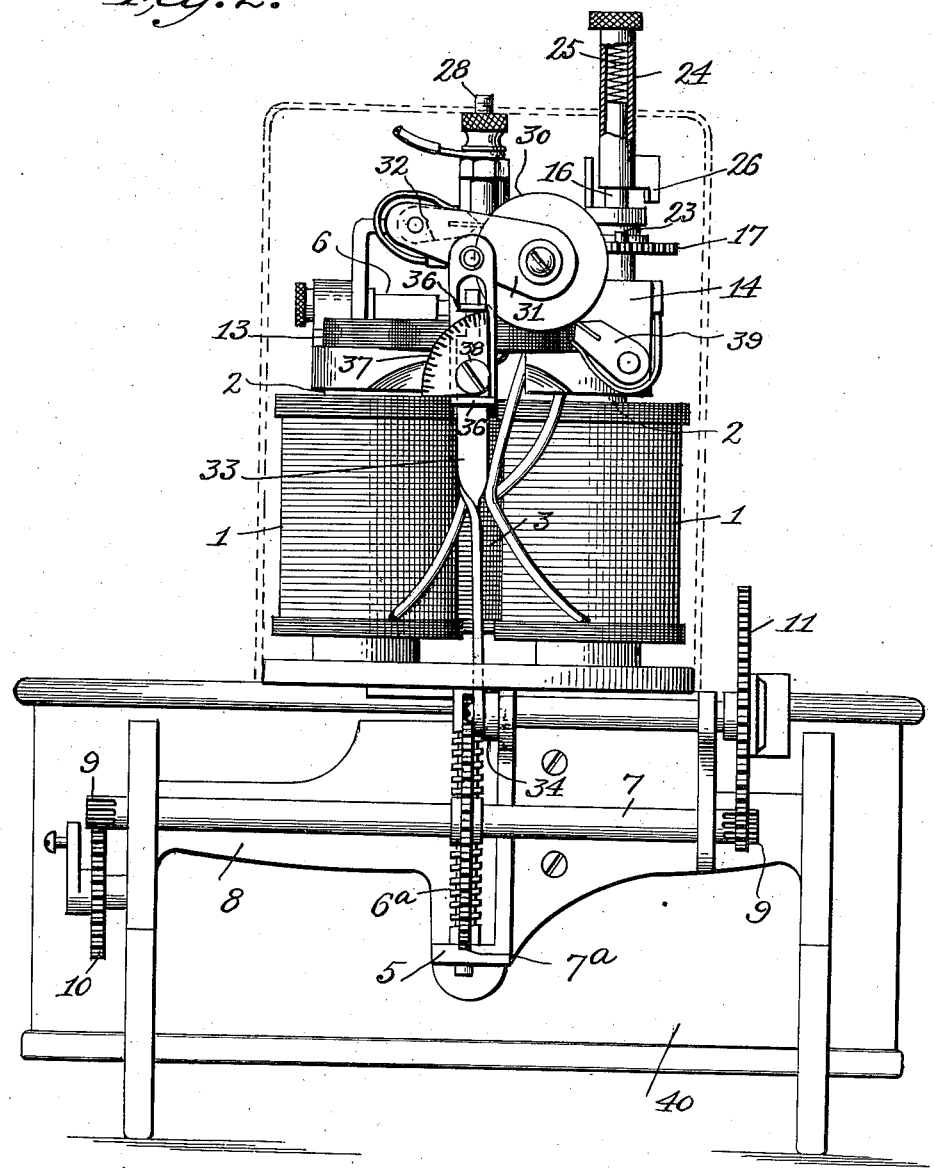

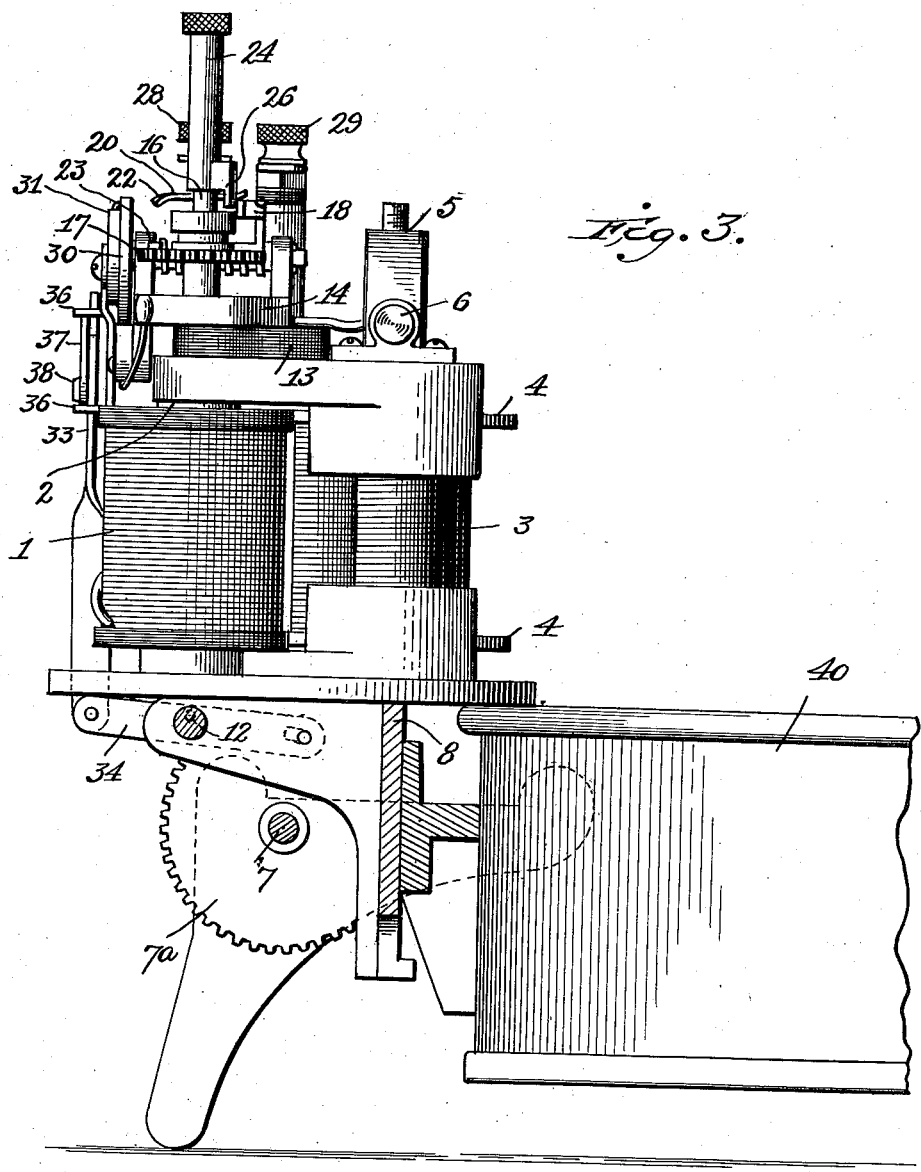

UNITED STATES PATENT OFFICE.

JOHN BUCKLEY, OF BOSTON, MASSACHUSETTS, ASSIGNOR TO ADOLPH SOMMER, OF BOSTON, MASSACHUSETTS.

CONTROL MECHANISM FOR ELECTRIC MOTORS.

1,136,405.   Specification of Letters Patent.   Patented Apr. 20, 1915.

Application filed May 28, 1913. Serial No. 770,462.

*To all whom it may concern:*

Be it known that I, JOHN BUCKLEY, a citizen of the United States, residing at Boston, in the county of Suffolk and State of Massachusetts, have invented certain new and useful Improvements in Control Mechanism for Electric Motors; and I do hereby declare the following to be a full, clear, and exact description of the same, reference being had to the accompanying drawings, forming part of this specification, and to the figures and letters of reference marked thereon.

The apparatus of the present invention is designed more especially for controlling small electric motors designed to run advertising devices, the object of the invention being to provide a controlling mechanism which may be manually set to establish the motor circuit and automatically operated by the motor itself to break the circuit and arrest the movement of the motor after a predetermined time, the parts being left in such position that they may be again manually set for establishing the circuit by the simple manipulation of a hand operated part.

The invention consists primarily in a motor controlled mechanism having a fixed and a movable contact through which the motor circuit is established, a driving connection from the motor for the movable contact and a manually controlled operating connection for the movable contact, whereby it may be moved in advance of its motor operated connection for reëstablishing the circuit, the motor controlled driving connection being adapted to advance the movable contact for breaking or disrupting the circuit.

The invention further consists in certain novel details of construction and combinations and arrangements of parts, all as will be hereinafter described and pointed out particularly in the appended claims.

Referring to the accompanying drawings,—Figure 1 is a top plan view of a motor and its control mechanism embodying the present improvements, certain parts of the driving connections for the advertising mechanism being shown. Fig. 2 is an elevation looking at the field magnet side of the motor. Fig. 3 is an elevation from a point of view at right angles to Fig. 2, with parts broken away to show parts which would otherwise be concealed from view. Fig. 4 is a perspective view of the essential parts of the switch mechanism with parts broken away.

Like letters of reference in the several figures indicate the same parts.

The motor illustrated, embodies generally speaking, field magnet coils indicated by the numeral 1, for energizing field magnets 2, the pole pieces of which are preferably arranged at the ends or top and bottom of an armature 3. The armature 3 usually embodies three separate coils or windings, the cores of which terminate in segmental top and bottom pole pieces 4, and it is mounted on a vertical axis with bearings 5 at top and bottom. The commutator and brushes are preferably arranged at the upper end of the armature as shown at 6, and the lower end of the armature shaft is in the form of a driving screw or worm $6^a$ whereby with a comparatively light torque a considerable power may be developed for driving the main shaft 7 through a worm wheel $7^a$ in mesh with the worm.

The shaft 7 is journaled in the frame 8, which latter also carries the motor, and is provided at opposite ends with pinions 9 with which gear wheels 10 and 11 mesh, said gear wheels constituting the drivers for the display and advertising devices not shown herein. The gear wheel 11 is carried by a shaft journaled in the frame and at the end opposite said gear wheel provided with a short crank or eccentric 12 which constitutes the primary driving connection for the switch mechanism to be hereinafter described.

While the controlling or switch mechanism may be mounted in any desired position with relation to the motor it is preferably mounted on the upper pole pieces of the field magnets, its direct support being formed by a piece of fiber or insulating material 13 rigidly secured upon the said pole pieces and adapted to suport a frame or casting 14 having bearings in which is mounted a worm shaft 15 and a vertically extending stud or post 16 rigid with the frame 14. The worm 15 meshes with a worm wheel 17 journaled on the post 16, whereby, upon the rotation of the worm, the wheel 17 will be rotated with considerable power, but at a very slow speed. Journaled loosely on the post 16 above the worm wheel 17 is a movable contact 18, the contact surface of which is elongated horizontally in its path of movement and provided with an intermediate depression or notch 19, the function of which will be presently described.

A fixed contact preferably in the form of a resilient arm 20 is mounted on an insulating support 21 carried by the frame 14 in position to coöperate with the movable contact 18 during one portion of the rotary movement of the latter. The contact end of the arm 20 is also preferably elongated in the path of movement of the movable contact 18 and its forward end 22 is bent downwardly to coöperate with the notch 19 and thereby maintain the parts in engagement until they are separated by a positive driving movement or pressure applied to the movable contact. This driving movement is imparted to the movable contact by a pin 23 mounted on the worm wheel 17, and it is adapted to advance the movable contact out of engagement with the fixed contact and to leave it in such position that it may be still farther advanced manually through a sufficient arc of the circle to again come into effective contact engagement with the member 20. For effectuating this manual movement, the post 16 is adapted for the reception of a key 24 within the cavity of which there is a spring 25 for normally holding the key in its elevated position, where it is out of engagement with any of the switch members. The lower end of the key is however provided with a finger 26, which when the key is depressed, lies in the path of movement of a pin 27 on the movable contact 18 and consequently by depressing the key and imparting a rotary movement thereto, the movable contact will be swung around into contacting position to reëstablish the circuit after the same has been broken by the operation of the motor.

The action of the fixed contact on the movable contact at the instant when the latter has been advanced to a point where the parts are about to separate is to project the movable contact forwardly to thereby disrupt the circuit with a snap action so as to avoid injurious arcing or sparking such as might occur with a slow separating movement of the parts.

The circuit wires may be attached to binding posts 28 and 29, both mounted on the frame 14, with suitable insulating material for preventing short circuiting in the well understood manner, and in the preferred construction the binding post 28 is connected directly with or forms the anchorage for the fixed resilient contact 20, and it will be understood that the binding post 28, fixed contact 20, movable contact 18 and frame 14, on which the movable contact is mounted are included in the circuit which supplies current to the motor.

For operating the worm shaft 15 from the crank 12, the worm shaft is preferably provided from its end with a disk or wheel 30 and an oscillatory operating arm 31 having a spring pressed friction pawl 32 thereon for coöperation with the disk 30. It is connected by an adjustable link 33 with the outer end of a lever 34 journaled on the frame by a slot connection 35 and having a bearing for the crank 12 before referred to.

In order to vary the throw of the operating arm 31 the link 33 is preferably divided into two sections, one adapted to move longitudinally in bearings 36 in the other, and an adjustable interponent is provided for limiting the amount of relative play between the parts, it being thus possible to give the operating arm 31 a throw which is equal to that of the outer end of the lever 34, or a throw which is only a fractional part of such movement. The interponent illustrated is in the form of a quadrant 37 having a cam shaped periphery and adapted to be held in adjusted position by a screw 38. The quadrant may be graduated to facilitate its adjustment for operating the switch member in any desired predetermined time, which time may be empirically determined after the speed of the motor is established by the current supplied to the same.

The main frame of the apparatus is shown as mounted on one end of a tank 40, which thus constitutes a part of the support, the apparatus being specifically designed for advertising the water proof qualities of leather or footwear which will be repeatedly immersed in the water in the tank and withdrawn by the operation of the motor in connection with a display of suitable signs, all of which, however, forms no part of the present invention.

In operation the motor is started by manipulating the key 24 so as to bring the movable contact 18 into engagement with the resilient fixed contact 20. The motor through the connections described reciprocates the operating arm 31 to thereby intermittently advance the worm shaft 15, reverse movement being prevented by the check pawl 39. The worm shaft 15 in turn operates the worm wheel 17 and advances the pin 23 until it finally engages and moves contact 18 out of engagement with the fixed contact 20. Owing to the fact that the contact surfaces of the two contacts are extended in their path of travel, the movable contact may be immediately swung around so as to reëngage the fixed contact without being arrested by the pin 23 and consequently the motor may, if so desired, be immediately started without other manipulation than the manual key manipulation referred to.

The parts may be adjusted so as to cause a rotation of the wheel 17 and pin 23 in practically any desired interval of time; thus, it may be made either a few minutes or hours in duration, but the motor is invariably stopped in due time so as to prevent any waste of the current and so as to overcome any liability of the motor being left in operation through the carelessness of the attendant, when the same should be shut down.

It will be understood, of course, that the whole motor and switch mechanism, with the exception of the ends of the binding post and the key 24 are adapted to be inclosed in a casing indicated by dotted lines in the drawing, whereby they are protected from injury and accumulations of dirt or dust.

Having thus described my invention, what I claim and desire to secure by Letters Patent of the United States is,—

1. In an electrically operated advertising device, the combination with an electric motor and gearing driven thereby, of a switch mechanism for breaking the motor circuit embodying a fixed contact, a second contact rotatable about an axis into engagement with the fixed contact, said movable contact being adapted to rotate in one direction only, driving connections intermediate the motor and movable contact for rotating the same and separating the contacts, and manually operated means directly coöperating with the movable contact for positively rotating it in the same direction whereby the contacts are again restored to their operative positions.

2. In an electrically operated advertising device, the combination with an electric motor and gearing driven thereby, of a timed switching mechanism for rupturing the motor circuit, embodying a rotary switch arm having a contact surface, and a coöperating fixed contact, said switch arm being rotatable in one direction only, a driving connection directly engaging the switch arm for positively rotating the same to separate the contacts and rupture the circuit, and rotary means manually operated for positively rotating the switch arm farther in the same direction to reëstablish its operative engagement with the fixed contact.

3. In an electrically operated advertising device, the combination with an electric motor and gearing driven thereby, of a switch for rupturing the motor circuit, embodying a fixed elastic contact, a rotatively movable contact with driving connections between the same and motor for rotating the movable contact while permitting said contact to rotate independently of the driving connections, and manually operated rotatable means coöperating directly with the movable contact for positively rotating it farther in the same direction to reëstablish the circuit after the same is ruptured by the operation of the motor.

4. In a device such as described, the combination with an electric motor, gearing driven thereby and switch operating connections driven by said gearing, of a switching mechanism for rupturing the motor circuit embodying a fixed resilient contact, a rotary switch arm having a contact surface for coöperating with said fixed contact, an operating wheel in the driving connections having a projection for direct coöperation with said switch arm for rotating the latter to separate the contacts and rupture the circuit, and manual means for further rotating the switch arm in the same direction to effect contact between the contact surfaces and establish the motor circuit.

5. In an apparatus such as described, the combination with the electric motor and gearing driven thereby, of a switch mechanism for rupturing the motor circuit embodying a fixed resilient contact, a rotary switch arm having a contact surface extending in the line of its movement, an operating wheel driven from said gearing, a projection on said operating wheel in position to directly coöperate with the switch arm and rotate the latter out of engagement with the fixed contact, and a manually operated key for still further advancing the switch arm in the same direction to reëstablish the engagement between the arm and fixed contact.

6. In an apparatus such as described, the combination with the electric motor and gearing driven thereby, of switching mechanism for rupturing the motor circuit at a predetermined time embodying a fixed contact, a rotary switch arm having a contact surface for coöperation with the said fixed contact, an operating wheel journaled on an axis coincident with the axis of the switch arm and having a projection thereon for coöperating directly with and rotating said arm, but leaving the arm free to advance independently of the wheel, a rotary key having a projection for coöperation with the switch arm, whereby the arm may be manually rotated in the same direction to reëstablish the circuit independently of the operating wheel and its projection, and intermittent driving connections intermediate said wheel and motor operated gearing.

7. In an apparatus such as described, the combination with the electric motor, of a switch mechanism for rupturing the motor circuit at a predetermined time, embodying a fixed contact, a rotary switch arm for coöperation therewith, an operating wheel loosely engaging said arm to rotate the same out of engagement with the fixed contact, said arm being free to rotate independently of said wheel, a worm shaft for operating said wheel and intermittent driving connections intermediate said worm shaft and motor, substantially as described.

8. In an apparatus such as described, the combination with an electric motor and gearing driven thereby, of a switching mechanism for rupturing the motor circuit, embodying a fixed contact, a rotary switch arm having a contact surface for coöperating with the fixed contact, an operating wheel having a rigid projection for direct coöperation with the switch arm and driving connections intermediate the gearing and operating wheel embodying a lost motion connection.

9. In an apparatus such as described, the combination with an electric motor and gearing driven thereby, of a switching mechanism for rupturing the motor circuit embodying a fixed resilient contact, a rotary switch arm having a contact surface for cooperation with the fixed contact, said switch arm being free to advance under the impelling force of the resilient fixed contact, an operating wheel, a rigid projection moved by said operating wheel for rotating the switch arm without restricting its forward movement, and operating connections intermediate said wheel and motor driven gearing.

10. In an apparatus of the class described, the combination with an electric motor and gearing driven thereby, a switching mechanism for rupturing the motor circuit embodying fixed and movable contacts, and manually operated means for reëstablishing connection between the contacts, of an operating wheel, a reciprocating operating arm, means on said arm for coöperating with said wheel, an adjustable link and connections intermediate said link and motor driven gearing for actuating said operating wheel, said wheel having a projection thereon for coöperation with the movable contact whereby when the operating wheel is actuated the movable contact is rotated and the motor circuit broken.

JOHN BUCKLEY.

Witnesses:
C. H. Chase,
Charles L. Warren.